June 14, 1966  P. A. YADRON ET AL  3,255,944
APPARATUS FOR VERTICAL WELDING
Filed Dec. 19, 1963  4 Sheets-Sheet 1

INVENTORS
Peter Anthony Yadron
Donald Clement Bertossa
Gerald De Wane
By Merriam, Smith & Marshall
Attorneys June 14, 1966    P. A. YADRON ET AL    3,255,944
APPARATUS FOR VERTICAL WELDING
Filed Dec. 19, 1963    4 Sheets-Sheet 2
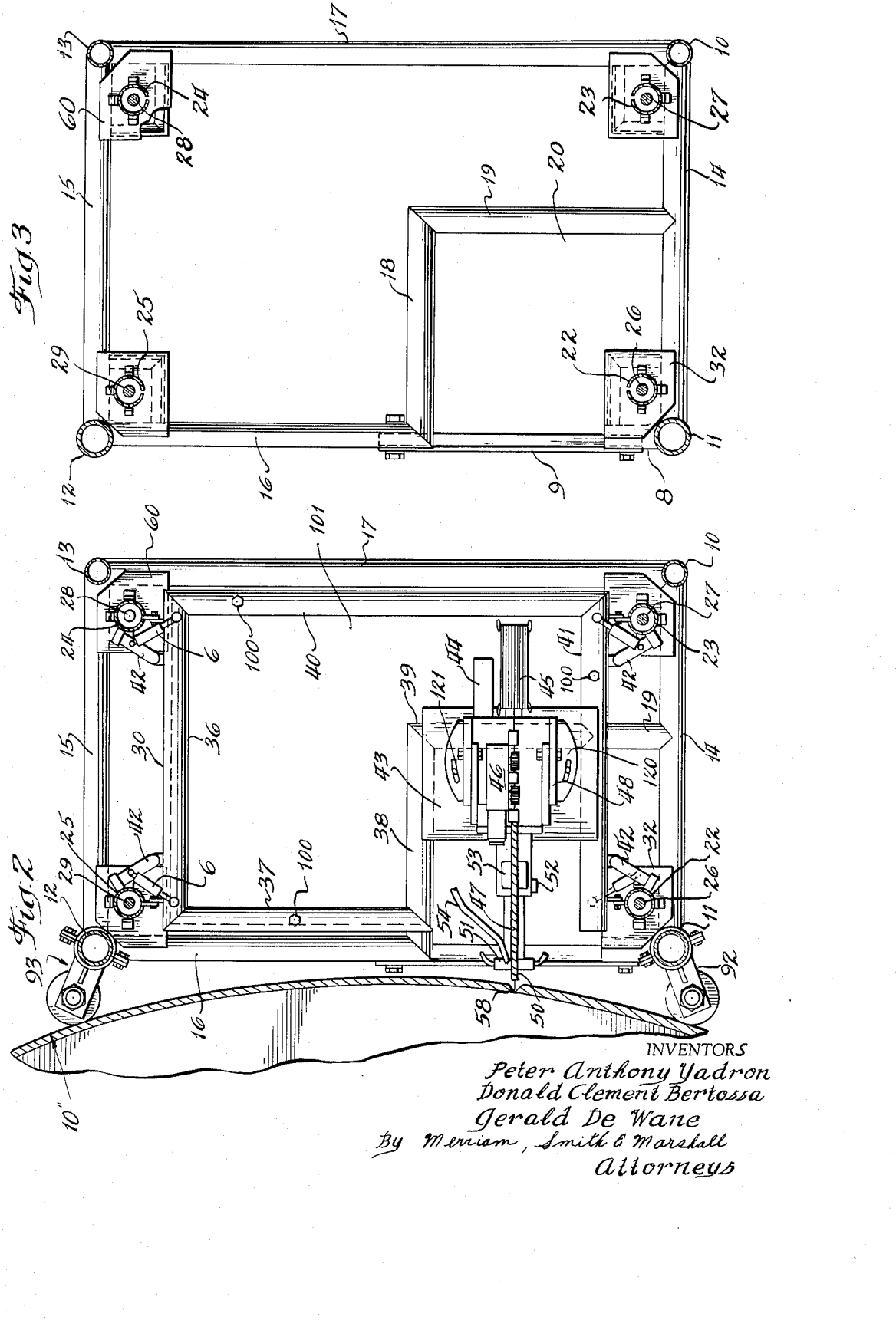
INVENTORS
Peter Anthony Yadron
Donald Clement Bertossa
Gerald De Wane
By Merriam, Smith & Marshall
Attorneys June 14, 1966 P. A. YADRON ET AL 3,255,944
APPARATUS FOR VERTICAL WELDING
Filed Dec. 19, 1963 4 Sheets-Sheet 3

INVENTORS
Peter Anthony Yadron
Donald Clement Bertossa
Gerald De Wane
By Merriam, Smith & Marshall
Attorneys

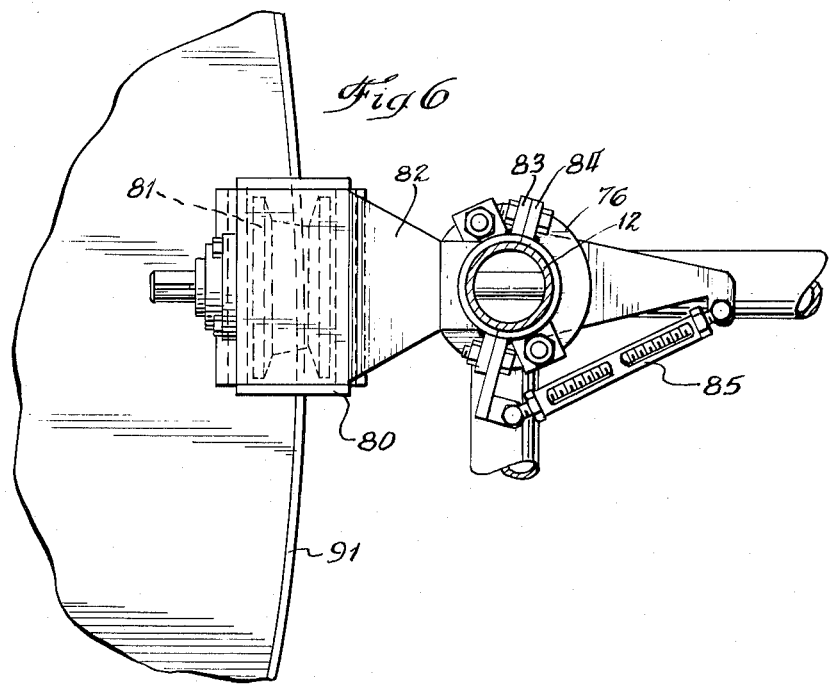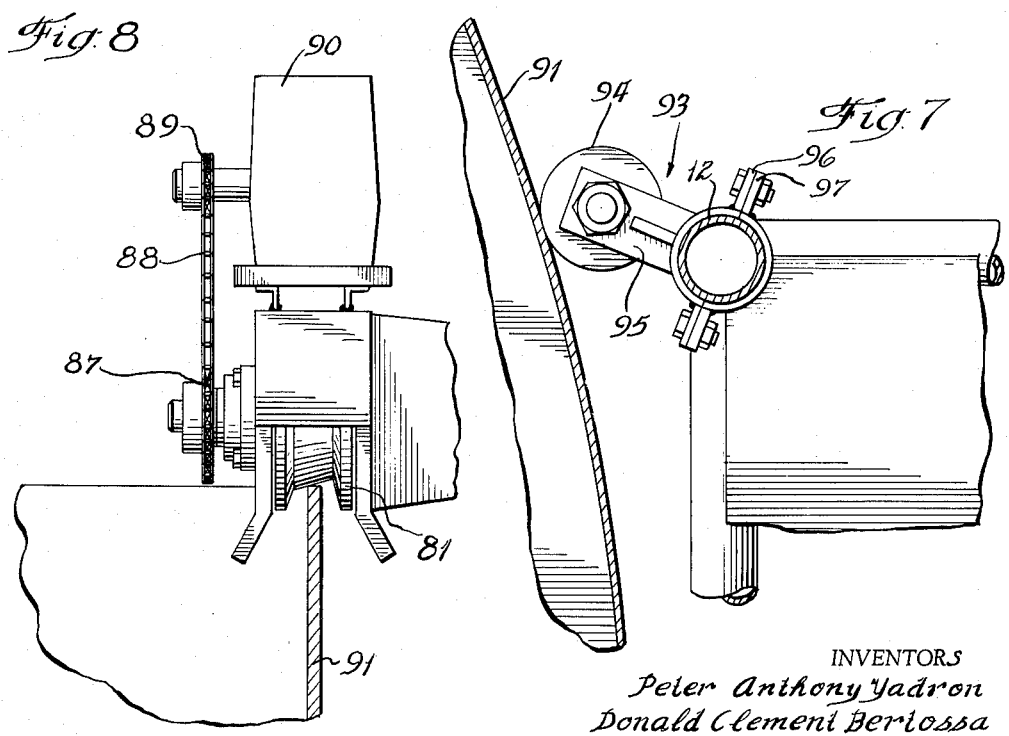

United States Patent Office 3,255,944
Patented June 14, 1966

1

3,255,944
APPARATUS FOR VERTICAL WELDING
Peter Anthony Yadron, Riverdale, Donald Clement Bertossa, Naperville, and Gerald De Wane, Chicago, Ill., assignors to Chicago Bridge & Iron Company, Oak Brook, Ill., a corporation of Illinois
Filed Dec. 19, 1963, Ser. No. 331,703
3 Claims. (Cl. 228—25)

This invention pertains to welding and particularly to continuous and automatic welding of long vertical joints such as are used in the construction of large storage tanks and in other welding situations.

The welding of vertical joints in the field erection of large tanks and vessels is generally a time-consuming hand operation. Because of the time involved and the skilled labor which must be employed, this aspect of the erection operation necessarily involves a substantial cost. It would therefore be desirable for such vertical joints to be welded automatically, not only because of the cost involved, but also to obtain uniform quality of welds to thereby provide stronger joints and a more standard quality.

Various methods of vertical welding have been proposed in the past as see for example U.S. Patent 2,794,901 and various apparatus for automatically moving the welding equipment to do the welding have been proposed.

More recently, there has been invented a more suitable method of making vertical welded joints, such as in large vessels and storage tanks, as will be seen from the pending U.S. patent application of Arnold et al. Serial No. 298,050 filed July 29, 1963. The vertical welding method of that application broadly comprises the joining together of vertically upstanding plates having vertical edges approximately equally spaced from each other in abutting, including near abutting, upright position by means of a vertical weld produced by placing a cooling and weld-retaining shoe-bar at the junction of the plates with the inner vertical side of the shoe-bar comprising a nose portion positioned between the vertical abutting edges of the plates in approximate contact therewith between the front and back plate surfaces, moving the shoe-bar upwardly while depositing molten metal between the abutting edges of the plates and against the inward vertical nose portion of the bar, cooling the molten metal as the shoe-bar moves progressively upwardly and effecting solidification of the weld while it is in contact with the inner face of the shoe-bar. This first weld pass joins the plates together by a weld of less thickness than the plates being joined. At least one more weld pass is applied between the abutting edges of the joint and in intimate continuous fusion with the first weld pass.

Although the described method of producing welded vertical joints, as well as the production of vertical welded joints by prior art processes, might be effected using an auxiliary rig holding the welding head apparatus and other necessary equipment to move the welding head uniformly along the joint to be welded and produce a uniform weld, no wholly satisfactory welding rig was available for producing vertical welded joints, regardless of the actual method used in making the weld itself.

There is accordingly provided by the subject invention novel welding apparatus, which can be used in field erection of large storage tanks and vessels, that has great flexibility and adaptability for use in producing vertical welded joints. The apparatus permits an operator to be stationed in the welding rig itself and to be transported in a convenient observable position as the welded joint progresses. This permits the operator not only to observe the weld and its quality as it is produced, but also to service and adjust the welding head during the actual welding operation. The apparatus is also characterized by its unique structure which facilitates the production of welded joints very near, and about at, the bottom of the joint to be welded together. This feature, therefore, eliminates or substantially reduces the need for any hand welding in the vertical joint such as might otherwise be required at the base of a vertical walled cylindrical storage tank and particularly at the base of the lowermost ring of plates utilized in the construction of such tanks.

The invention will now be described in conjunction with the accompanying drawings in which:

FIG. 2 is a horizontal section taken at the line 2—2 of FIGURE 1;

FIG. 3 is a horizontal section taken on the line 3—3 of FIGURE 1;

FIG. 6 is a detailed view showing the arrangement of the parts which make up the supporting structure for the rollers which support the rig and run about the top edge of the plates;

FIG. 7 is a detailed view showing a caster wheel and its supporting elements; and FIG. 8 is an elevation showing the drive mechanism for moving the entire rig along the upper edge of plates being welded together.

Figure 1:
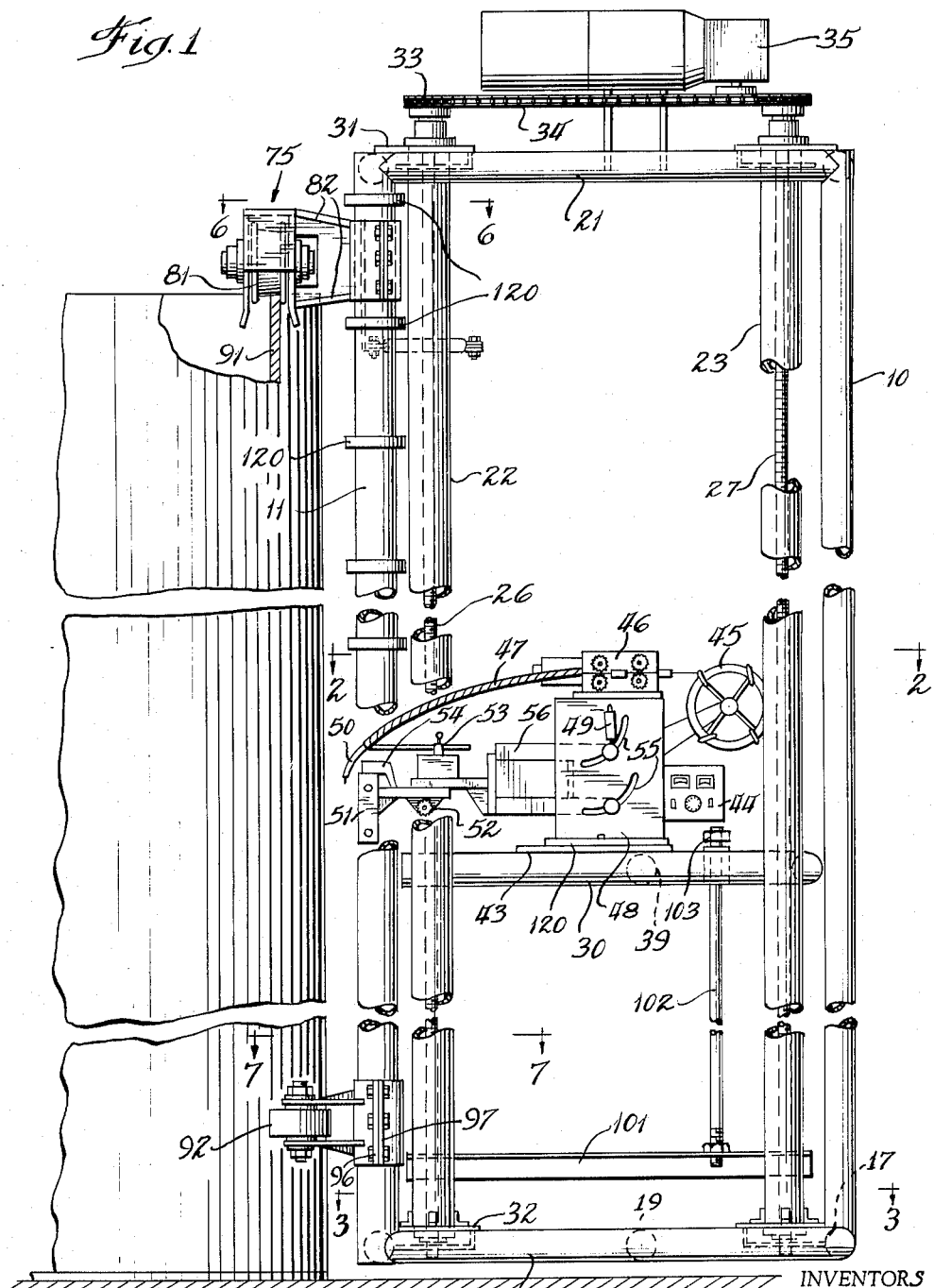
FIG. 1 is a side elevation of the welding rig apparatus mounted on the top edge of vertical plates of a tank under construction.

Referring to FIGURES 1, 2 and 3, it will be seen that the welding rig is a cage-like open framework structure. The exterior basic structure comprises four vertically disposed tubular elements 10, 11, 12 and 13, which are connected at the top and bottom by horizontal tubular elements. As shown in FIGURE 3, the tubular elements 14, 15 and 17, which are the bottom horizontal connecting elements, are joined to the vertical elements so as to form a three-sided structure. The front side of the carriage, which is that side of the carriage from which the welding is done and which side abuts the surface of the plates to be welded, does not have horizontal tubular elements running directly from the vertical elements 11 and 12. Thus, as shown in FIGURE 3, bottom horizontal tubular element 16 runs only part way from the vertical element 12 and then it branches as element 18 and then branches again as tubular element 19 to connect with element 14. The result of such branching of the elements 18 and 19 is to leave an open area 20 which gives freedom for operating the welding head and adjusting the same to produce the welded joint. Bar 9 runs from element 16 to a connecting stub 8 to stiffen the structure and protect the internal area of the rig. Bar 9 is removably attached as by bolts. The upper part of the rig has four horizontal tubular elements peripherally connecting the vertical corner elements. As shown in FIGURE 1, one of these is tubular element 21 and it connects the corner vertical elements 10 and 11.

With particular reference to FIGURES 1 and 2 it will be seen that the basic cage structure as already described has an internal carriage structure which broadly comprises four tubular elements 22, 23, 24 and 25 in which are positioned elongated screws 26, 27, 28 and 29, by which means the welding head supporting platform 30 is raised and lowered within the welding rig Tubular element 22, which is essentially identical to the elements 23, 24 and 25, is appropriately connected at its top and bottom ends to metal plates which are fastened to the horizontal tubular elements forming the external cage structure. Thus, the lower end of tube 22 is connected to plate 32 and at its upper end is connected by plate 31 to the upper part of the rig. The purpose of the tubes 22, 23, 24 and 25 is to provide protection against injury from the four rotating screws which are used to move the supporting carriage 30 upwardly and downwardly. Each of the screws, such as 26, is appropriately mounted in bearing elements at the top and bottom ends thereof and at the upper ends are connected to sprocket means 33 which by means of chain 34 are all moved at the same time and at the same speed by motor means 35.

The welding head support carriage or platform 30 is made up of tubular elements 36, 37, 38, 39, 40 and 41 to make up a substantially rectangular structure except that the tubular parts 38 and 39 angle inwardly to provide an open area for facilitating handling and work on the welding head. The carriage structure 30 is secured against significant lateral movement by means of retaining means 42 positioned at each corner thereof. The retaining means 42 is comprised of an arm pivotally mounted to the carriage frame 30 and provided with a small idler wheel at the end thereof which rotates in contact with the exterior surface of the adjacent tubular element containing a screw means, such as against the surface of tube 24. Turnbuckle means 6 are provided for adjusting the location of the idler wheel on the retaining means 42 and the pressure of the wheel against the vertical corner tubes, such as 24.

Mounted on the carriage structure 30 is metal plate 43 for supporting the welding head and ancillary equipment. Thus, there is provided a plate 120 which is rotatably mounted on plate 43 by means of a bolt in slot 121. The rotatably mounted plate 120 permits the welding head to be adjusted normal to the joint to be welded in arcuate plates. The vertical housing 48 is mounted on plate 120 and has two arcuate slots in each plate making up a side and in which there is mounted pivotal, movable structure 56. The hydraulic ram 49 is used to move the pivots, on structure 56, within the slots 55. As a result the structure 56 can be moved into and away from the joint being welded. In this way, the water-cooled, copper shoe-bar 51 is moved to the vertical joint and the proper pressure maintained against the plates being joined together. Lateral adjustment of the shoe-bar is achieved by control means 52. Oscillation of the welding wire is achieved by means 53 which supports the end of the wire supporting flexible cable 47 which delivers the end of the welding wire to the joint. Welding wire is provided on reel 45 and is delivered by wire drive 46 through flexible cable 47 into copper tip 50 from which the wire emerges into the joint 58 being welded. An inert gas can be delivered by tube 54 to the area surrounding the weld so as to eliminate oxidation and the like. Panel 44 is provided for the necessary welding controls, such as volt and ammeter instruments.

Figure 5:
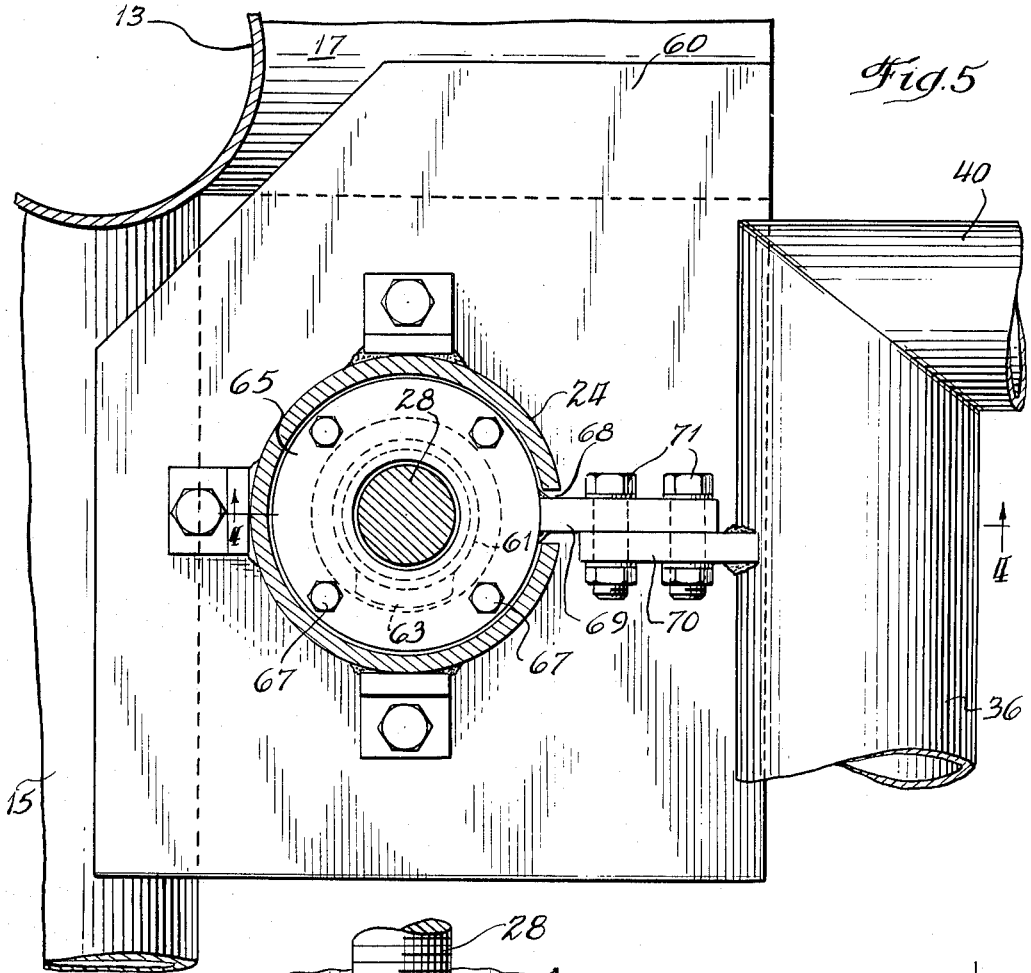
FIG. 5 is a horizontal sectional view taken at 5—5 of FIGURE 4 showing one of the four supporting corners of the rig and the lower support plate for the vertically positioned screw means for driving the welding head carriage or platform up and down.
Figure 4:
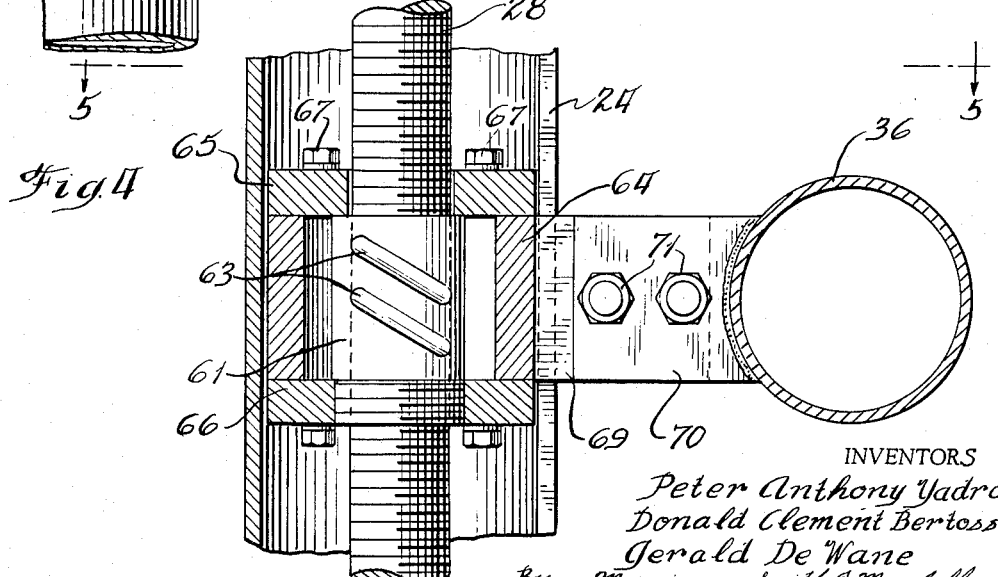
FIG. 4 is a vertical section along the line 4—4 of FIGURE 5 and shows in detail the arrangement by which the welding head support is drivably connected to the vertically positioned screws in the protecting metal sleeves.

Vertical displacement of the carriage platform 30 is achieved by the screw means previously described by contacting the screw with a screw-engaging nut means that is connected by suitable structure to each of the corners of the carriage platform 30. With reference to FIGS. 4 and 5, it will be seen that the screw 28 is centrally positioned in the tubular element 24 which is fastened at its lower end to plate 60. Nut 61 of the type employing ball bearing means is threaded around the screw 28 and collar 64 is placed around the nut. Ring elements 65 and 66 are provided to hold the nut 61 and collar 64 together by means of bolt means 67. The nut can be threaded into ring 66 to keep it from rotating with the screw 28. Ball bearings encased in the nut 61 ride in grooves 63. The tubular element 24 is provided with a vertical slot 68 which runs axially the entire length of the tube 24 and keys the collar 64. Attached to collar 64, such as by means of welding, is plate 69 which projects through the slot opening 68. The plate 69 is connected to plate 70, such as by bolt means 71. The plate 70 is in turn connected, as by welding, to the tubular element 36 forming part of the carriage platform. Thus it is seen that upon movement of the screw, vertical displacement of the carriage platform is achieved. Although only one of the means for obtaining vertical displacement has been described, there are one to three additional such structures provided at the other outermost corners of the carriage platform 30 for engaging each of the vertical screws adjacent thereto and which are located in the protective tubular elements provided with similar vertical slots running for their entire length.

Mounted near the upper portion of the tubular elements 11 and 12 are welding rig supporting roller assemblies 75 and 76, as shown in FIGURES 1, 2 and 6, mounted on the respective tubular elements 11 and 12. The supporting roller of each assembly is rotatably mounted in an inverted channel-like structure which is supportably connected to a clamping arrangement for movably clamping the roller assembly to the supporting tubular structure 11 or 12. Thus, the roller assembly 76 is shown in FIGURE 6 (and 75 in FIG. 1 is similar) to comprise an inverted channel structure 80 in which roller 81 is rotatably mounted. Plates 82 support the roller and connect it to clamping elements 83 and 84 which together engage the supporting tubular element 12. Bolt means are provided for adjustably mounting said clamping means and there is also provided turn-buckle 85 for fine, but rigid adjusting of the position of the supporting roller. The adjustability of such supporting rollers is advisable because the welding rig in practice would be used on structures having joints which are essentially used to connect flat plates and plates which are slightly and highly arced, such as in making small and large diameter cylindrical storage vessels such as up to 200 ft. in diameter. It is therefore important that the supporting rollers be adjustable to accommodate the horizontal linear edge upon which they will rest. Thus, as shown in FIGURE 6, the wheel 81 is supported on the upper edge of an arcuate plate 91.

One or more of the supporting rollers 81 can be used to propel the welding rig along the upper edge of the metal plates being joined together to transport the apparatus from one vertical joint to another. As shown in FIGURE 8, propelling means can be supplied to a supporting wheel 81 by mounting a sprocket 87 on the axle thereof and by means of chain 88 which meshes with sprocket 89 connected to motor 90, the propelling can be readily effected. The motor 90 is mounted directly on top of the housing supporting the roller and thus is movable as a unit whenever the roller need be adjusted to take care of changes in the amount of arc involved in the plates being joined together.

Because of the weight of the welding rig is considerable, there are provided caster roller assemblies connected at the lower portion of the tubular elements 11 and 12. These caster roller assemblies 92 and 93 are substantially alike and one thereof, namely, 93, is shown in greater detail in FIGURE 7. In this figure, the caster roller 94 is horizontally mounted on supporting plate 95 which is connected to clamping structure 96 and 97 which together surround the supporting tubular element 12. Bolt means are provided for adjustably securing the assembly to the tubular element 12. Adjusting of the caster rollers is desirable so that flexibility in the use of the welding rig can be achieved and permit its utilization in joining flat plates, slightly arced plates and those which are very substantially arced.

Because the height of the plates used in producing large vessels such as cylindrical storage vessels vary in height such as from 6, 8, 10 to 12 ft., the supporting roller assemblies 75 and 76 are mountable at various distances from the top of tubular elements 11 and 12 between rings 120 spaced apart sufficiently far to accommodate the clamping means 83 and 84.

In order to support the welding operator, a platform 101, as shown in FIGURE 1, is provided supported by the carriage platform 30 by means of three supporting elongated bolts 102 which are movably slidable through three openings 100 located in the tubular framework of carriage platform 101. When the welding of the joints begins, the operator's platform 101 is at the bottom of the welding rig and in substantial contact with the bottom part of the carriage platform 30. As the welding progresses upwardly, the operator's platform 101 continues to remain stationary until the carrage platform 30 has been elevated sufficiently for the retaining means 103 at the top of the bolt 102 to engage the upper surface of the carriage platform and stop further slidable movement in the holes 100. Once that position is reached, the operator's platform 101 moves upwardly at the same rate and integrally with the carriage platform 30. Thus, the provision of an operator's platform 101, which is slidably mounted to the carriage platform supporting the welding head, makes it possible for the joint to be welded very near to its most bottom edge and yet permits the operator to subsequently stand on a platform which places the welding head and ancillary equipment at a more suitable working and observing level after the weld progresses up the joint. It therefore becomes unnecessary for the operator to stoop for any more than a minimum period during the initial production of welded joints on the very lowermost course of welded plates comprising the first ring used in producing a storage vessel. Obviously, after the first ring of such vessels has been completed and the welding rig is employed in producing vertical welded joints on subsequent rings added atop thereto, the operator's platform 101 will always be in a suspended position with regard to the carriage welding platform 30. Thus, the operator's platform 101 could project substantially the length of the bolts 102 below platform 30 and below horizontal tubular element 14, and thereby provide a most convenient and comfortable operator's standing area for readily handling, regulating and observing the progress of the welded joint.

Although the drawings show a rig with four vertical corner elements and four screw means, a satisfactary rig can be produced having as few as three vertical corner elements arranged in triangular fashion with accompanying screw means positioned as desired within the rig to move the welding head platform.

Furthermore, while the drawings show the welding head positioned such that the bottom few inches of the vertical joint nearest the ground could not be welded with it so positioned, this has been done solely for purposes of clarity in the drawings. Simple adjustments in the welding head are all that would be required to effect the weld at the lower most part of the joint.

Various changes and modifications of the invention can be made and, to the extent that such variations incorporate the spirit of this invention, they are intended to be included within the scope of the appended claims.

What is claimed is:

1. Apparatus for joining abutting vertical edges of vertically disposed plates by means of a welded joint which comprises a cage-like framework having four vertical corner members joined together at the top and bottom by horizontal members, suspension roller means for movably supporting the framework on the upper edges of the plates with one vertical side of the framework adjacent the plates, caster roller means at the lower part of the said side for contacting the plates to facilitate horizontal movement of the apparatus and steady it against the plates, said suspension roller means and caster roller means being adjustable arcuately to move the framework away from and closer to the plates, a vertical screw means mounted inside the framework and adjacent each of the four corner posts, each of said screw means being about as long as the corner posts and in fixed but rotatable position to the framework, means for simultaneously operating the screw means at the same speed, and a welding head platform movably mounted within the framework and operably connected to each of the screw means for moving the welding head platform upwardly and downwardly.

2. Apparatus according to claim 1 in which each of screw means is enveloped by a tubular protecting cover.

3. Apparatus according to claim 1 having an operator's platform suspended below and under the welding head platform, said operator's platform being suspendable below the bottom of the framework when the welding head platform is near the bottom of the framework, means which permits movement of the welding head platform for a predetermined distance without movement of the operator's platform and means for obtaining a simultaneous rate of movement of the welding head platform and operator's platform after said predetermined distance has been reached.

References Cited by the Examiner

UNITED STATES PATENTS

| | | | |
|---|---|---|---|
| 1,740,117 | 12/1929 | Pinckney | 228—45 |
| 2,781,441 | 2/1957 | Ballentine et al. | 219—126 |
| 3,134,014 | 5/1964 | Shupp | 219—126 |
| 3,164,714 | 1/1965 | Swan et al. | 219—126 |

WHITMORE A. WILTZ, *Primary Examiner.*

M. L. FAIGUS, *Assistant Examiner.*